Figure 1:
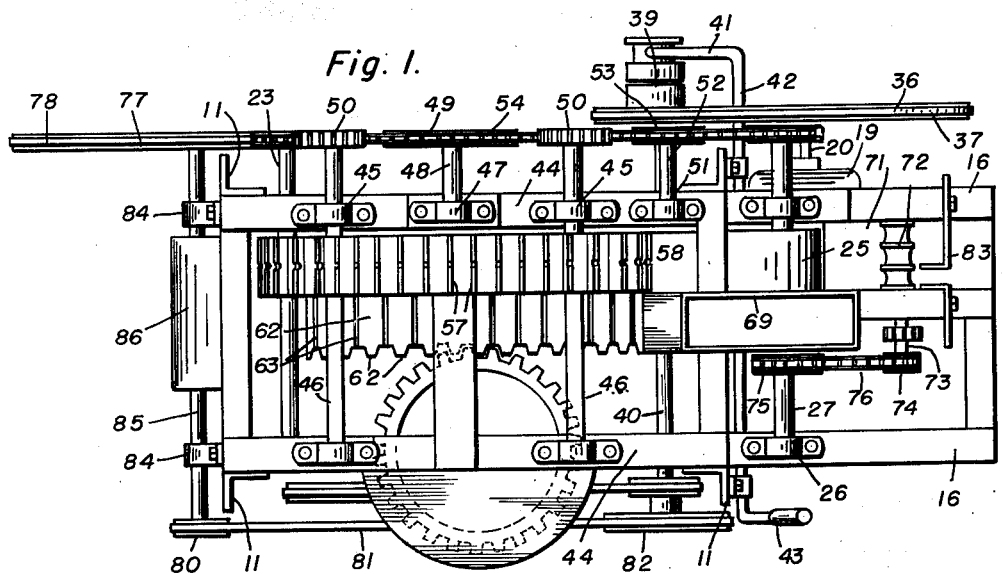

April 1, 1952 G. S. WASHBURN 2,591,033
APPARATUS FOR FORMING CANDY BARS
AND INSERTING STICKS THEREIN
Filed Aug. 4, 1947 5 Sheets-Sheet 1

Inventor

Grady S. Washburn

By *Clarence A. O'Brien and Harvey B. Jacobson*
Attorneys

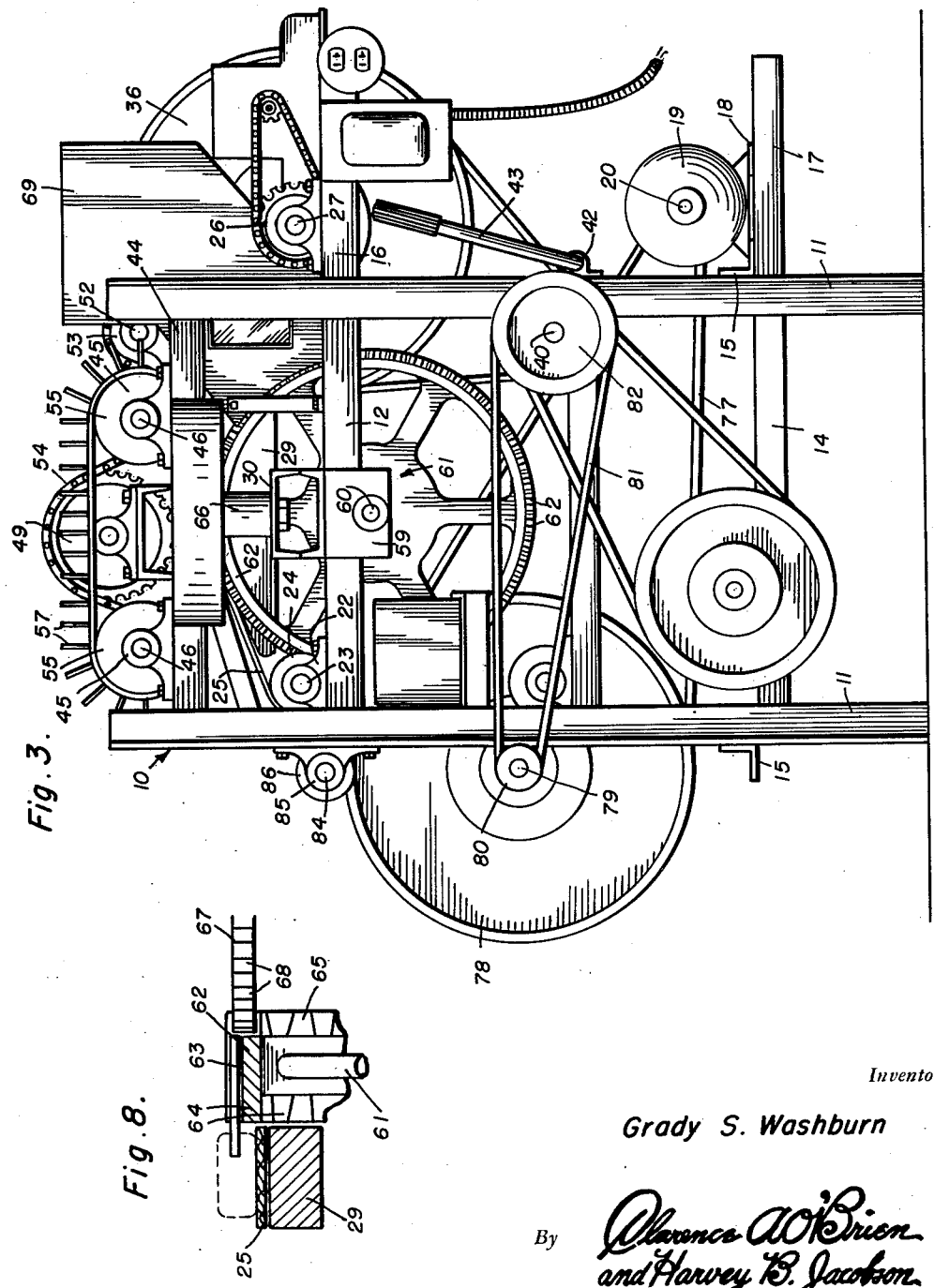

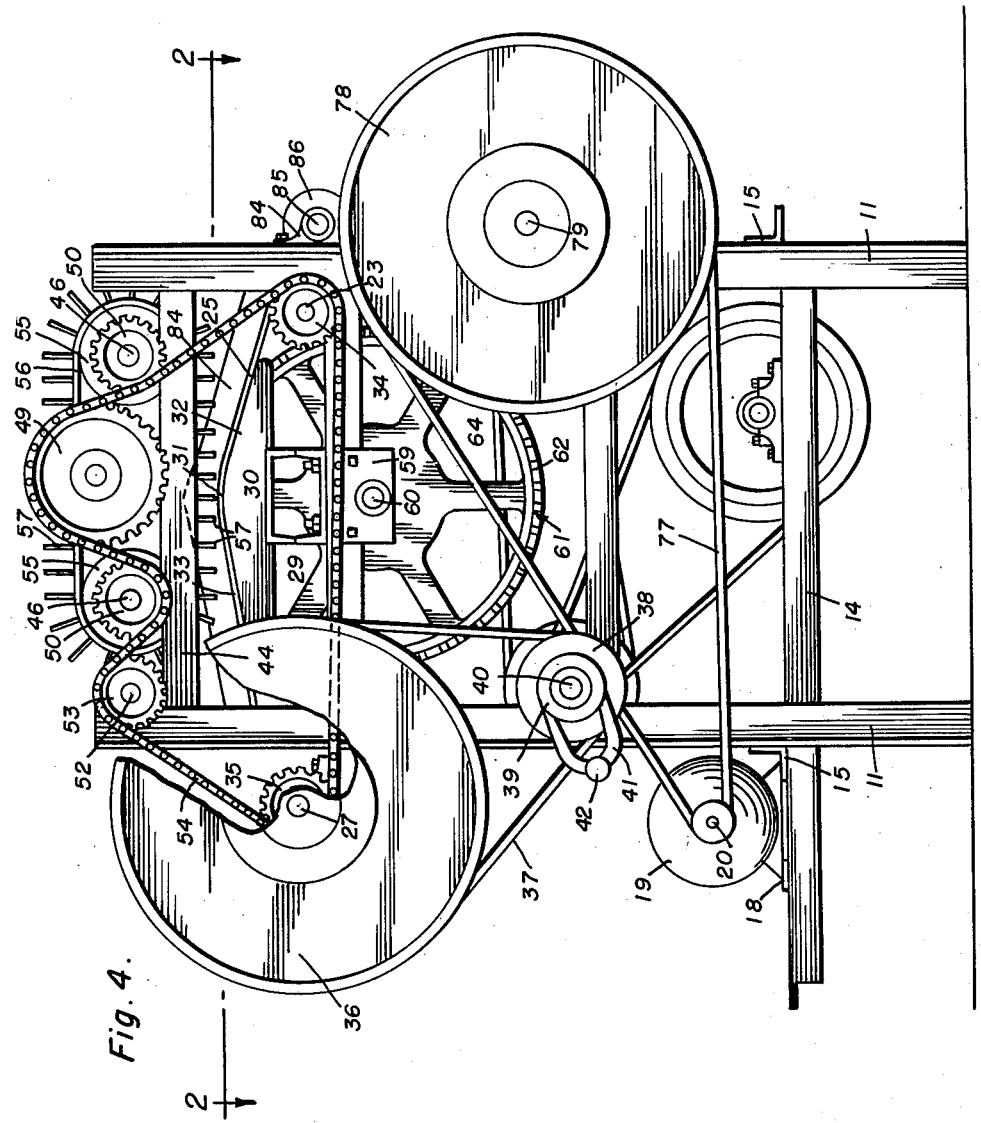

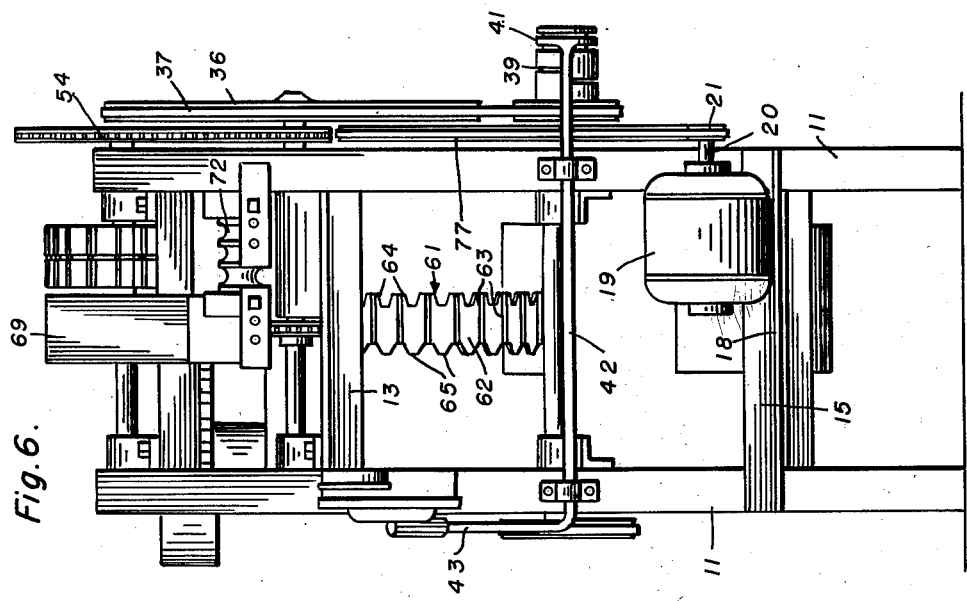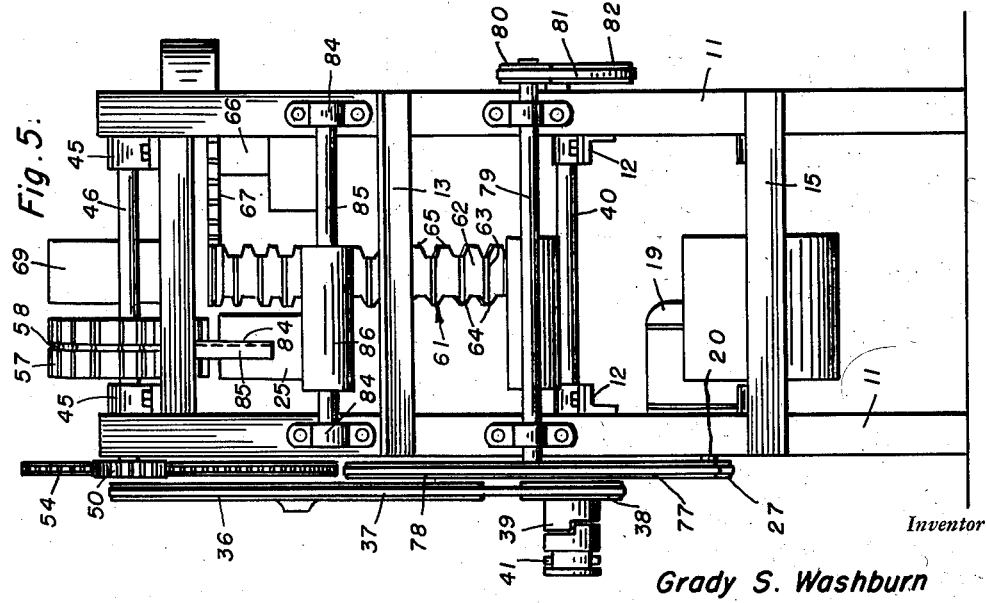

Patented Apr. 1, 1952

2,591,033

UNITED STATES PATENT OFFICE 2,591,033

APPARATUS FOR FORMING CANDY BARS AND INSERTING STICKS THEREIN

Grady S. Washburn, Macon, Ga.

Application August 4, 1947, Serial No. 765,990

5 Claims. (Cl. 107—8)

This invention relates to apparatus for forming candy bars and inserting sticks therein and has for its primary object to produce a candy bar which may be easily handled without soiling the hands or clothing of the consumer.

Another object is to produce candy bars and insert sticks therein without contacting either the sticks or the bars with the human hands, thus preserving the sanitary condition of the product.

The above and other objects may be attained by employing this invention which embodies among its features advancing a viscous mass of candy in a substantially horizontal path, successively separating bars from the viscous mass and while so separating the bars inserting sticks thereinto.

Other features include means for advancing a viscous mass of candy toward a severing station, means moving in unison with the mass advancing means, progressively to enter the mass at spaced points and successively to sever bars therefrom and means moving in unison with the mass advancing means to advance a stick into each bar as it is being severed from the mass.

Still other features include means to advance a viscous mass of candy upwardly toward a severing station and to move bars severed therefrom downwardly from the severing station, means above and moving in a rectilinear path in unison with the mass advancing means progressively to enter the mass and successively sever bars therefrom at the severing station, means successively to present sticks to a position adjacent the severing station and means to move a stick longitudinally along an axis which lies perpendicular to the direction of the movement of the mass and insert it into a bar while the latter is being severed from the mass.

Figure 2:
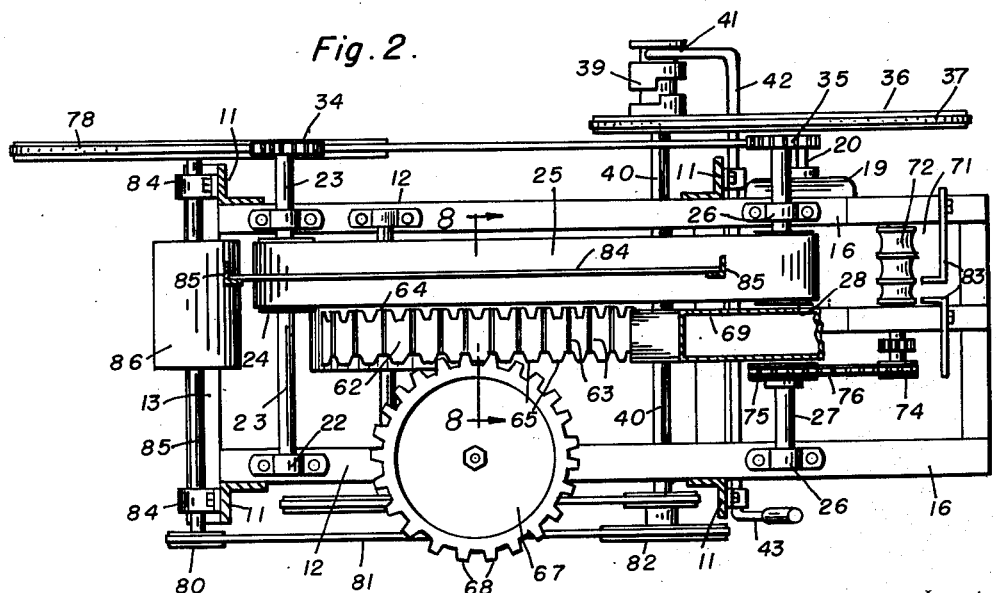
Figure 7:
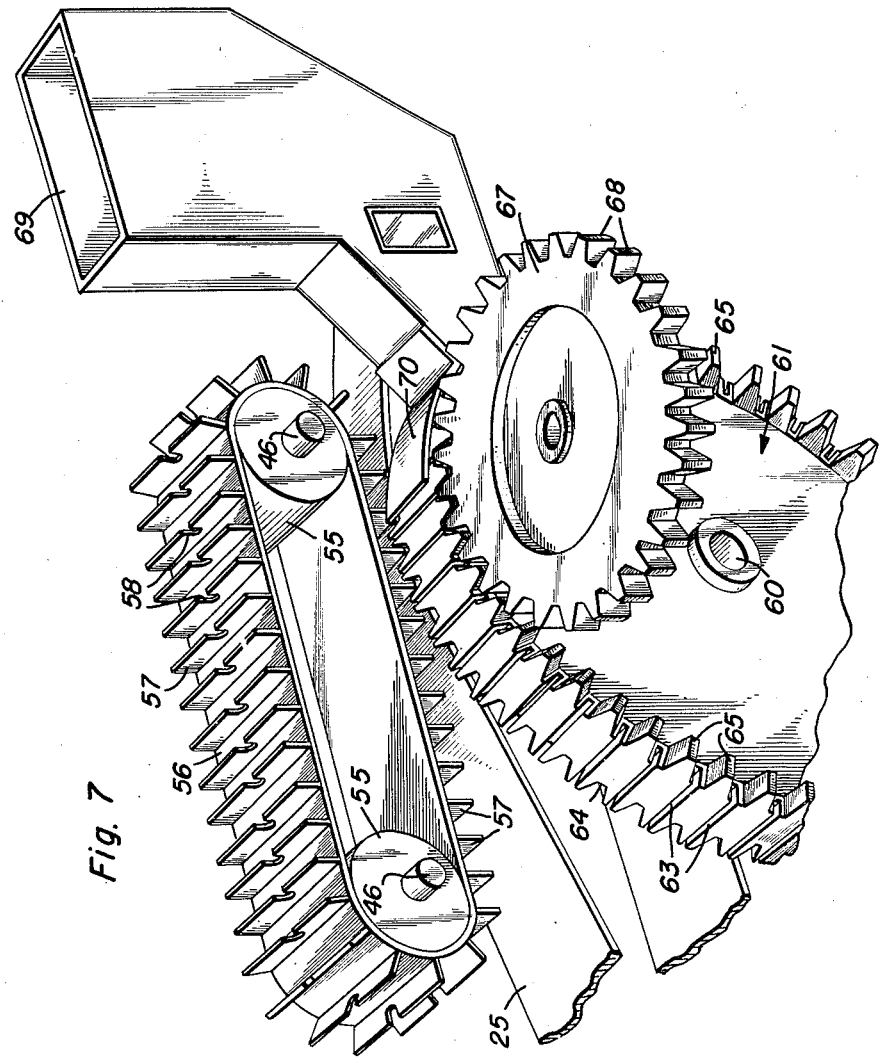

In the drawings:

Figure 1 is a top plan view of a candy machine embodying the features of this invention, Figure 2 is a horizontal sectional view through the machine illustrated in Figure 1 and taken directly beneath the severing means, Figure 3 is a side view of the machine illustrated in Figure 1, Figure 4 is a side view of the machine taken from the side opposite Figure 3, Figure 5 is an end view of the discharge end of the machine, Figure 6 is an end view of the feeding end of the machine, Figure 7 is an enlarged fragmentary perspective view of the mass advancing and severing mechanism, illustrating the stick advancing mechanism in association therewith, and Figure 8 is a fragmentary enlarged sectional view taken substantially along the line 8—8 of Figure 2.

Referring to the drawings in detail, a frame designated generally 10 is formed of four legs 11 joined intermediate their ends by side bars 12 and cross bars 13. Similar side bars 14 and cross bars 15 join the legs near their lower ends and the side bars 12 and 14 are extended respectively, as at 16 and 17, beyond one end of the frame. Supported on the extensions 17 is a table 18 upon which a drive motor 19 is supported. The drive shaft 20 of the drive motor is equipped with a drive pulley 21 through the medium of which power is transmitted to the machine.

Mounted in suitable brackets 22 attached to the legs 11 at one end of the machine and extending transversely thereof is a shaft 23 carrying a roller 24 which forms a guide roller for the main feed belt 25 for the candy mass. Fixed to the extensions 16 adjacent the end of the machine opposite that carrying the bracket 22 are bearing brackets 26 in which a drive shaft 27 is journaled. This drive shaft 27 extends transversely of the machine in parallel relation to the shaft 23 and carries intermediate its ends a drive roller 28 for the belt 25 above referred to. The bottom run of the belt 25 lies in a substantially horizontal plane, while the upper run thereof is guided upwardly over a guide shoe 29 mounted on a suitable transversely extending support 30 carried on the side bars 12 substantially midway between opposite ends of the machine. This guide shoe 29 is formed midway between opposite ends with an elevated portion or hump 31 from opposite sides of which the faces 32 and 33 incline downwardly so as to lie in planes which lie tangent to the peripheries of the rollers 24 and 28. Secured to the shafts 23 and 27 adjacent one side of the machine are drive sprockets 34 and 35 respectively, and secured to the drive shaft 27 adjacent the drive sprocket 35 is a large drive pulley 36 which is driven by a belt 37 through the medium of the conventional clutch mechanism 39 carried by a shaft 40. The clutch mechanism 39 is coupled through the medium of a fork 41 to a transversely slidable shaft 42 carrying at the end opposite the fork 41 a hand lever 43 by means of which the engagement and disengagement of the clutch may be controlled.

Extending longitudinally on opposite sides of the machine and attached to the legs 11 adjacent their upper ends are supporting bars 44 carrying bearing brackets 45 in which transversely extending shafts 46 are journaled. A suitable bearing bracket 47 is supported on the guide bars 44 midway between the bearing brackets 45 and journaled therein is an idler shaft 48 carrying an idler sprocket 49. Each shaft 46 is equipped with a drive sprocket 50 arranged to rotate in a plane with the idler sprocket 49, and mounted in a suitable bracket 51 carried by the side bar 44 adjacent the sprockets 50 is a stub-shaft 52 carrying an idler sprocket 53. The sprockets 49, 50 and 52 are arranged to rotate in the same plane with the sprockets 34 and 35, and trained over these sprockets is an endless drive chain 54. It will thus be seen that when the pulley 36 is driven, the sprockets 34, 35, 49, 50 and 52 will be driven in unison.

Fixed to the shafts 46 intermediate their ends are drive rollers 55 over which an endless belt 56 is trained. The upper and lower runs of the belt 56 operate in spaced parallel planes which lie parallel to the bottom run of the belt 25, and the lower run of the belt 56 is spaced above the hump 31 of the shoe 29 for a distance sufficient to produce the thickness of the candy bar desired. Extending outwardly from the belt 56 are transversely extending severing knives 57 which lie in spaced relation to one another and when traversing the horizontal runs of the belt 56 extend parallel to one another as will readily be understood upon reference to Figure 4. Each of these severing knives is formed intermediate its ends with a slot 58 (Fig. 1) for a purpose to be more fully hereinafter described.

Mounted in suitable bearing brackets 59 and extending transversely of the machine substantially midway between the legs 11 and below the bottom run of the belt 25 is a shaft 60 which rotates in the brackets 59 and carries a stick feed wheel designated generally 61. This wheel is mounted to rotate in a plane beside the belt 25 and formed in its rim 62 are peripheral notches or transversely extending grooves 63. The wheel is so arranged with relation to the belt 25 that when a notch 63 is uppermost, its bottom wall lies slightly above the plane of the belt as will be readily understood upon reference to Figure 8 when the latter is at the highest point 31 on the shoe 29. The rim 62 of the wheel 61 is provided along opposite side edges with laterally projecting teeth 64 and 65 which as illustrated in the drawings, are so arranged that the teeth on one side of the wheel are staggered with relation to those on the opposite side of the wheel. As illustrated in Figure 7, the teeth 64 on one side of the wheel are engaged by the knives 57 so that as the belt 56 is driven, the wheel 61 will rotate in timed relation therewith. Mounted on the suitable support 66 carried by one of the side bars 12 for rotation above an axis which lies perpendicular to the axis of the wheel 61 is an ejector wheel 67 having an annular row of spaced peripheral teeth 68 which are adapted to mesh with the teeth 65 of the wheel 61 so that the wheel 67 will rotate in unison with the wheel 61. As illustrated, the periphery of the wheel 67 contacts the wheel 61 in such a manner that when a tooth 64 of the wheel 61 lies directly between a pair of knives 57 on the belt 56, a tooth 68 of the wheel 67 will be projected to its fullest extent between a pair of teeth 65 of the wheel 61 so that the outer end of the tooth 68 will force a stick lying in the groove 63 to advance transversely across the face of the belt 25 in spaced relation thereto.

In order to supply sticks to the grooves 63 and the wheel 61, I employ a hopper or magazine 69 having an inclined bottom from which sticks are fed toward the rim 62 of the wheel 61 so that sticks will be picked up as the wheel 61 is rotated and carried upwardly by the wheel in the grooves 63. A suitable guard 70 overlies a portion of the rim 62 of the wheel 61 to prevent sticks resting in the grooves thereof from becoming displaced during their approach toward the top of the wheel.

Carried by the extensions 16 is a feed table 71 over which a grooved feed roller 72 is rotatably supported. This feed roller is driven by a shaft 73 which carries a sprocket 74. A sprocket 75 is fixed to the shaft 27 and driving connection between the sprockets 74 and 75 is established by means of an endless chain 76. It will thus be seen that when the shaft 27 is rotated, the feed roller 72 will likewise be rotated.

The drive pulley of the drive motor 19 has a driving connection through the medium of an endless belt 77 with a large drive pulley 78 having driving connection with a transversely extending shaft 79 carried in a suitable bearing bracket attached to the legs 11 and extending transversely across the end of the machine opposite the motor 19. A drive pulley 80 is carried by the shaft 79 at the end opposite the end 78 and has driving connection through the medium of an endless belt 81 with a drive pulley 82 fixed to the shaft 40 adjacent the end opposite that carrying the clutch 39. Through the medium of the drive pulley 38 and the clutch 39 the power transmitted to the shaft 40 through the medium of the drive belts and pulleys just described may be transmitted to the belt 37 and drive pulley 36 at the will of the operator.

In order to facilitate the removal of cut candy bars from the machine, I mount in suitable brackets 84, the shaft 85 carrying the guide roller 86 over which a conveyor belt (not shown) is trained.

In use, it will be understood that the drive motor 19 is energized, thus transmitting power to the drive shaft 40 through the transmission belts above described. With a candy mass ready for formation, the latter is deposited on the table 71 and fed through suitable adjustable guides 83 thereon beneath the feed roll 72. With the hand lever 43 manipulated to engage the clutch 39, the shaft 40 will be driven, thus setting the belt 25, the belt 56, and the feed roll 72 into operation. The feed roll will serve as a sizing roll roughly to govern the size and shape of the candy mass. Feeding through the feed roll 72, the candy mass will encounter the belt 25 and will be moved thereby upwardly along the inclined face 33 of the shoe 29. As the candy mass approaches the hump 31, the blades 57 of the belt 56 cooperating with the hump 31 will successively sever candy bars from the plastic mass moving up the incline 33. Simultaneously, with the severing of a bar from the mass, a stick which is being carried upwardly by a groove in the rim 62 of the wheel 61 will be moved into alignment with the axis of the candy bar and projected thereinto by a tooth 68 of the wheel 67. Endwise movement of the candy mass under the influence of the pressure exerted by a stick on the bar being severed is prevented by the engagement of the mass with the longitudinal flange or wall 84 which follows the contour of the belt 25 as it rides over the hump 31 and is supported adjacent opposite ends on suitable brackets 85, in such a position as to be received in the slots 58 of the blades 57. Due to the pinching effect of the blades on the mass of candy riding on the belt 25 as the mass approaches the hump 31 of the shoe 29 it will be obvious that the bar being severed will be held firmly while the stick is being projected thereinto through the medium of the teeth 68 on the wheel 67.

From the foregoing it will be obvious that candy bars may be quickly severed from a plastic mass of candy and sticks inserted in the bars while their severing is taking place.

While in the foregoing there has been shown and described a preferred embodiment of this invention, it is to be understood that minor changes in the details of construction, combination and arrangement of parts may be resorted to without departing from the spirit of the invention as claimed.

Having described the invention, what is claimed as new is:

1. A candy bar forming and stick inserting machine comprising a conveyor including an endless web having horizontally disposed upper and lower flights, a guide shoe having a hump and downwardly inclined faces extending from opposite sides of said hump, said hump and faces bearing against the undersurface of said upper flight, an endless belt disposed above the upper flight of said conveyor and including spaced horizontally disposed upper and lower flights, transversely extending, longitudinally spaced cutting knives carried by said belt, the cutting edges of the knives carried by the lower flight of the belt lying in a plane parallel to the lower flight of said conveyor and spaced a short distance above the upper flight of said conveyor, said knives adapted to engage and cut at the hump a viscous mass of candy advanced on the upper flight of said conveyor, a stick feed wheel disposed on one side of the belt and conveyor and having an axis of rotation parallel to the axes of rotation of both the belt and conveyor, said wheel including an annular rim having circumferentially spaced stick retaining grooves, said annular rim being located in such a manner that a portion thereof is disposed between the lower flight of said belt and the upper flight of said conveyor above said hump, means drivingly interconnecting said belt and said wheel, a stick ejecting wheel having an axis of rotation perpendicular to the axis of rotation of said stick feed wheel, and means drivingly interconnecting said two wheels.

2. The combination of claim 1 and a means for preventing endwise movement of the candy mass as sticks are being forced therein, said last-named means including horizontally aligned slots through the cutting edges of said knives, a bar lying between said belt and conveyor and received in said slots, and means for securing the free ends of said bar to a supporting frame.

3. The combination of claim 1 wherein said first-named means includes circumferentially spaced teeth extending laterally from the inner perpiheral edge of said rim, several of said teeth engaging several of said knives carried by the lower flight of said belt.

4. The combination of claim 3 wherein said means drivingly interconnecting said two wheels includes an annular row of spaced peripheral teeth carried by stick ejecting wheel, and circumferentially spaced, laterally extending teeth projecting from the outer peripheral edge of said stick feed wheel and meshing with said stick ejecting wheel teeth.

5. The combination of claim 4 wherein the teeth projecting from the inner and outer opposing peripheral edges of said rim are circumferentially staggered and each of said stick retaining grooves extends laterally across said rim and terminates at the crest of an inner tooth and the trough of the opposing outer tooth.

GRADY S. WASHBURN.

REFERENCES CITED

The following references are of record in the file of this patent:

UNITED STATES PATENTS

| Number | Name | Date |
| --- | --- | --- |
| 971,097 | Woolf | Sept. 27, 1910 |
| 1,179,168 | Erny | Apr. 11, 1916 |
| 1,487,788 | Lombardo et al. | Mar. 25, 1924 |
| 2,005,584 | Davis et al. | June 25, 1935 |
| 2,278,574 | Spohr et al. | Apr. 7, 1942 |